(12) United States Patent
Hines, Jr.

(10) Patent No.: US 6,860,261 B2
(45) Date of Patent: Mar. 1, 2005

(54) BAKING OVEN CONSTRUCTION

(76) Inventor: Robert S. Hines, Jr., 150 Roller Rd., Unicol, TN (US) 37692

( * ) Notice: Subject to any disclaimer, the term of this patent is extended or adjusted under 35 U.S.C. 154(b) by 0 days.

(21) Appl. No.: 10/663,066

(22) Filed: Sep. 15, 2003

(65) Prior Publication Data
US 2004/0065311 A1 Apr. 8, 2004

Related U.S. Application Data

(63) Continuation-in-part of application No. 10/280,404, filed on Oct. 25, 2002.
(60) Provisional application No. 60/350,521, filed on Oct. 25, 2001.

(51) Int. Cl.$^7$ ................................. A21B 1/08
(52) U.S. Cl. ................... 126/20; 126/21 R; 126/273 R; 219/400; 219/401
(58) Field of Search .................. 126/20, 34, 369.1, 126/348.1, 20.1, 20.2, 359.1, 19 R, 21 R, 21 A, 273 R; 219/391, 385, 401, 400; 99/467, 468

(56) References Cited

U.S. PATENT DOCUMENTS

| | | | | | |
|---|---|---|---|---|---|
| 4,202,259 | A | * | 5/1980 | Johansson | 99/352 |
| 4,281,636 | A | * | 8/1981 | Vegh et al. | 126/369 |
| 4,648,381 | A | * | 3/1987 | Ishii et al. | 126/20 |
| 4,971,023 | A | * | 11/1990 | Martinez | 126/21 R |
| 5,680,810 | A | * | 10/1997 | Sham | 99/330 |
| 6,202,637 | B1 | * | 3/2001 | Roberts | 126/20 |

FOREIGN PATENT DOCUMENTS

JP     55-126742     *  9/1980    .................. 126/20

* cited by examiner

Primary Examiner—James C. Yeung

(57) ABSTRACT

An oven construction wherein the oven wall forms an oven cavity containing in a lower portion thereof a HTA producing device, wherein a steam generator is provided in the cavity in physically isolated relationship to the device, wherein the steam generator contains a plurality of metal balls which act as a heat sink, and wherein a water reservoir is provided on the outside of the oven and is in water flow communication with the steam generator thru a water feed line.

17 Claims, 4 Drawing Sheets

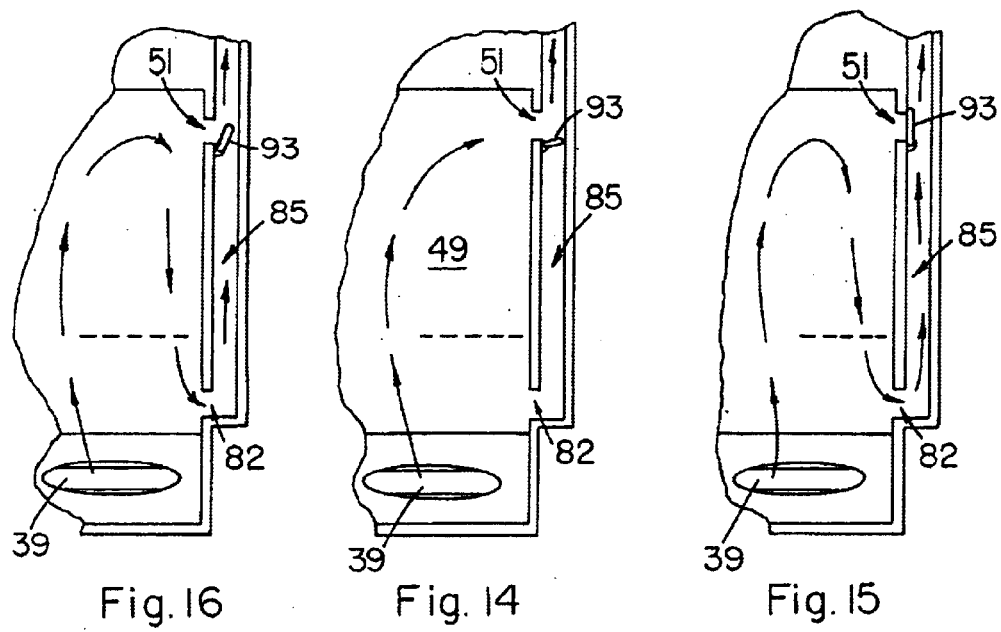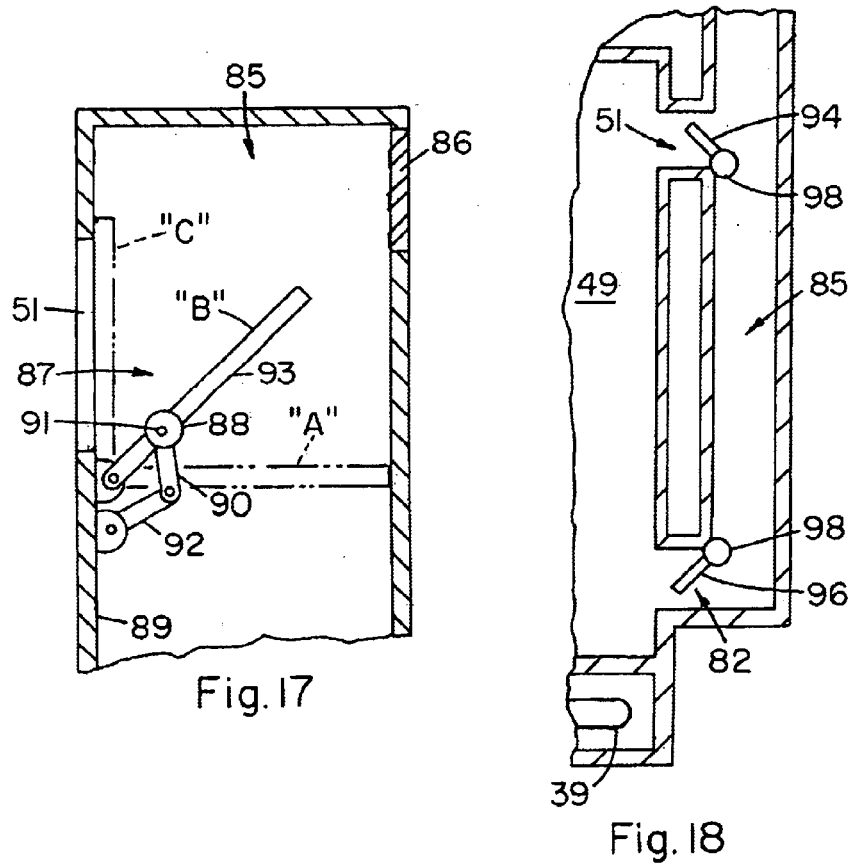

US 6,860,261 B2

BAKING OVEN CONSTRUCTION

This application claims priority under 35 U.S.C. 119(e)(1) based on Applicant's Provisional U.S. Patent Application Ser. No. 60/350,521, filed Oct. 25, 2001 and titled "Baking Oven Steam Generator".

This application is a continuation-in-part of applicants copending Ser. No. 10/280,404 filed Oct. 25, 2002 of same title and inventorship.

BACKGROUND OF THE INVENTION

1. Field

This invention concerns the modification of ovens, primarily of the rack type such as are used in homes, but also is useful in commercial size ovens, wherein the present modifications effect a unique hot air circulation pattern and, in a most preferred embodiment also features a conveniently located and easy to use unique steam generator. The present heated air circulation pattern dramatically improves the oven baking quality and efficiency and the generator provides limited bursts of steam to the oven in an improved manner to assist, e.g., in forming a thick, ruddy brown, crisp crust to bread particularly French bread being baked.

2. Prior Art

U.S. Pat. No. 5,680,810, the disclosure of which is hereby incorporated herein by reference in its entirety, discloses a radiant heat toaster oven provided with a steam generating system wherein a water filled tube is placed into contact with an electrical heating element whereby the water is brought to a boil and stem is allowed to escape thru vent holes in the tube.

SUMMARY OF THE INVENTION

The present oven in one preferred embodiment comprises wall means forming a substantially closed cavity means having an upper portion and a lower portion, HTA (high temperature air) supply means mounted in said lower portion of said cavity means for generating a rising HTA flow within said cavity means, and air flow outlet means thru a lower section of said wall means, whereby said HTA from said supply means will rise into said upper portion of said cavity means and then as it becomes cooler will gravitate downwardly into said lower portion of said cavity means and exit thru said outlet means, whereby said HTA will be forced to travel a longer residence path within said cavity means and release a larger amount of heat energy into said cavity means prior to discharge of said HTA therefrom.

In another preferred embodiment a steam generator means is mounted in said cavity means and comprises water inlet means, heat sink means, steam outlet means, water reservoir means mounted on the exterior of said wall means on an upper portion thereof, and water feed line means passing thru said wall means and into said cavity means and having one end connected to said reservoir means and having its other end juxtaposed said inlet means, whereby a measured amount of water can be poured into said reservoir means and conducted thru said feed line means into said inlet means and into contact with said heat sink means to produce a desired amount of steam.

BRIEF DESCRIPTION OF THE DRAWINGS

The present oven, in its preferred structural embodiments, is shown in FIGS. 1–13 wherein the scale and dimensions of the oven and steam generator components are shown for illustration of the invention only and are not intended to represent commercial ovens proportionately in size or configuration, wherein equivalent structure in the figures are numbered the same, and wherein;

FIGS. 14, 15 and 16 are vertical cross-sectional views of a gas oven showing a variation in discharge vent structure;

FIG. 17 is a side view of damper blade actuation means; and

FIG. 18 is a view as in FIGS. 14–16 showing a variation in discharge vent structure.

DETAILED DESCRIPTION

Figure 13:
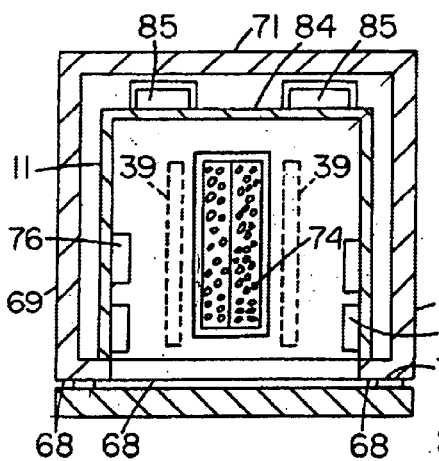
FIG. 13 is a cross-sectional view taken along line 13—13 of FIG. 12.
Figure 12:
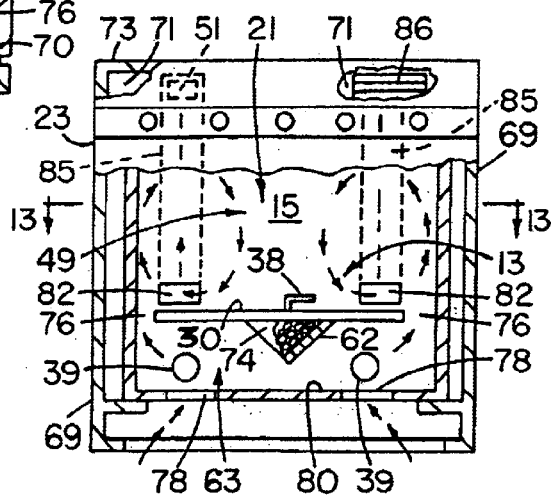
FIG. 12 is a front view of a gas fired oven wherein the various structural components are approximately drawn to scale but with thickness enlarged for clarity, with the door removed and showing a preferred form of steam generator and a preferred positioning of the heated air exhaust or discharge vents.

Referring to the drawings, a typical home oven 10 is shown as having an oven cavity means 49 formed by wall 11 which is spaced from outer wall 12 of the oven cabinet generally designated 23 for heat insulation whereby wall 11 provides a lower high heat portion 13 and an upper cooler air portion 21 in the cavity means 49. Provided for the oven are the structures of an oven door 14 conventionally hinged at the lower portion 16 of wall 12, a control panel 17 with control knobs 19 at the upper portion 18 of wall 12, and a loop-like electrical heating element 20 having its power/ground electrical connection ends 22, 24 inserted thru the rear or back portion 15 of cavity wall 11. Foot members 28 keep the heating element elevated a short distance above the oven floor or baffle plate means 30. Cabinet 23 as shown in FIGS. 12 and 13 has a front portion 68, sides 69, back wall 71 and top 73.

The present steam generator generally designated 31, in one embodiment, comprises a stainless steel open top body 32 having a thick base or flash pan 34, i.e., about ½ in. thick which functions also as a heat sink. A useful set of dimensions for body 32 is about 3 in. outside height, about 8 in. long on the inside, and about 3 in. wide on the inside. These dimensions can vary depending how much water one wishes to flash into steam and how fast.

The water is poured as needed into a reservoir 36 of, e.g., about 4–8 oz. capacity, preferably mounted on the front of wall portion 18 and is conducted thru a small metal tube or line 38 such as a ⅛ in. I.D. copper or stainless steel tubing. This line is affixed to the inside of wall 12 and runs, as shown, into the open top of body 32 without contacting heating element 20. The inlet end 41 or outlet end 42 of line 38 can be pinched as desired to feed the water onto flash pan 34 at a desired rate.

Referring to FIGS. 4–7, a much preferred steam generating body 44 preferably of tubular stainless steel pipe of, e.g., 1½ in. I.D. and 9 in. length, capped at both ends is employed and is provided with holes 46, one of which connects with outlet end 42 of line 38 and the others allowing the escape of steam. A bed 48 of ⅛" to ½", preferably ¼" diameter stainless steel balls is positioned in the tube to provide a mass to capture sufficient heat prior to introduction of water to flash the water from the tube when needed.

Figure 1:
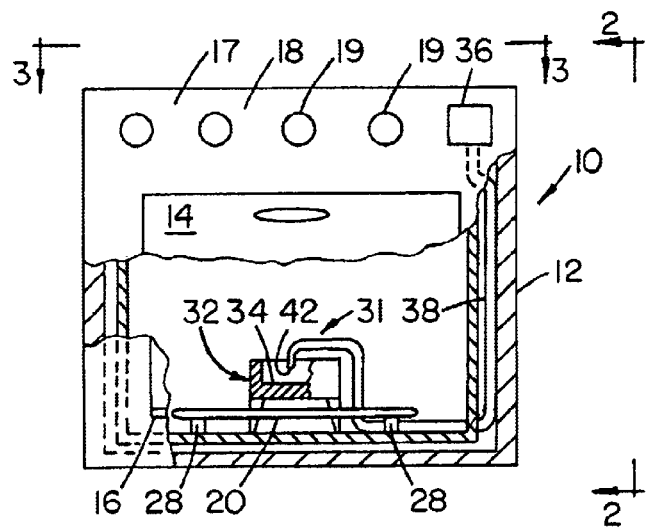
FIG. 1 is a front view of an oven with portions of the oven front and door, and the steam generator broken away for clarity.
Figure 2:
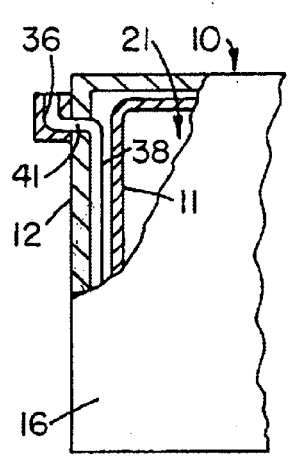
FIG. 2 is a side view taken along line 2—2 of FIG. 1 with portions broken away for clarity.
Figure 3:
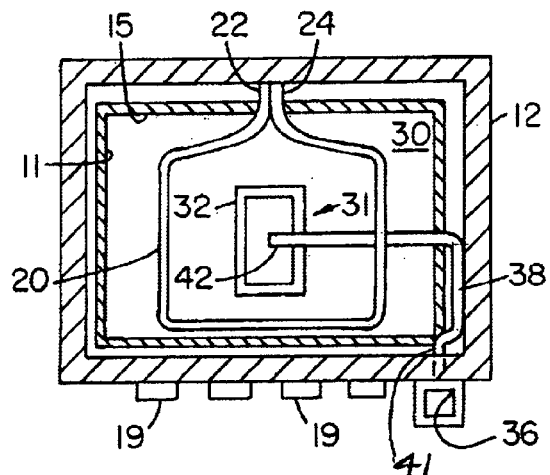
FIG. 3 is a cross sectional view taken along line 3—3 of FIG. 1.
Figure 4:
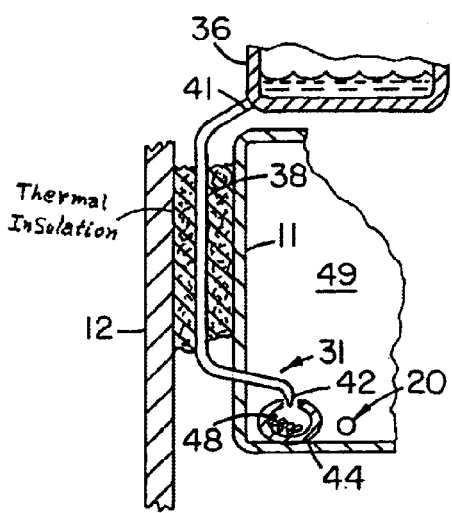
FIG. 4 is a cross-sectional view as in FIG. 2 but showing a preferred positioning of the steam generator with respect to the oven heating element.
Figure 5:
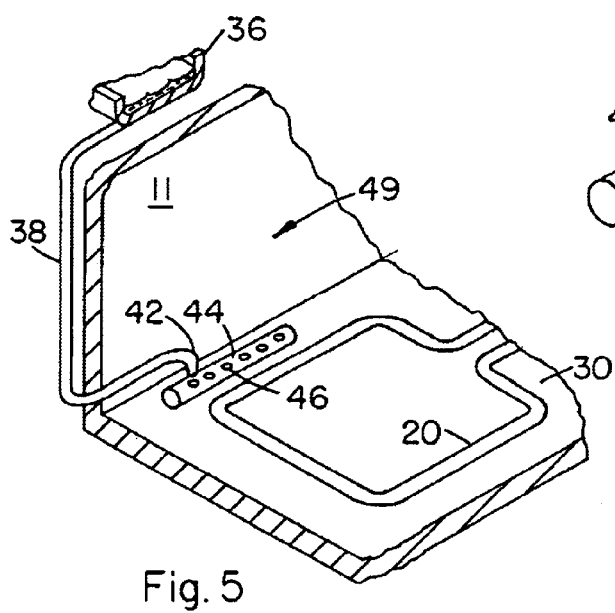
FIG. 5 is an isometric schematic of a portion of the oven interior showing preferred locations of the steam generator, water feed tube and water reservoir.
Figure 6:
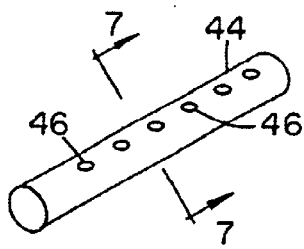
FIG. 6 is an isometric top view of a preferred steam generator tube.
Figure 7:
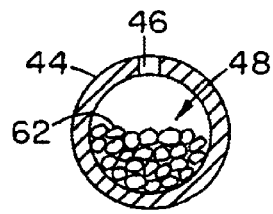
FIG. 7 is a cross-sectional view taken along line 7—7 of FIG. 6 in the direction of the arrows.

The position of the generator as shown in FIG. 5 within the oven cavity 49 is quite significant in that it is juxtaposed but not touching the heating element 20 so that the generator is maximally effective in absorbing radiant heat but doesn't block the heating element such as to cause a cold spot in the oven.

Figure 8:
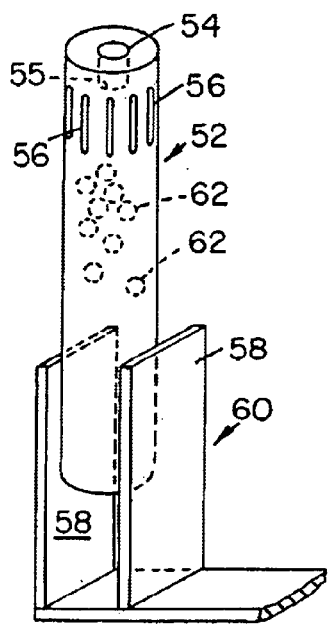
FIG. 8 is an isometric view of an upright tube steam generator with portions broken away for clarity.
Figure 9:
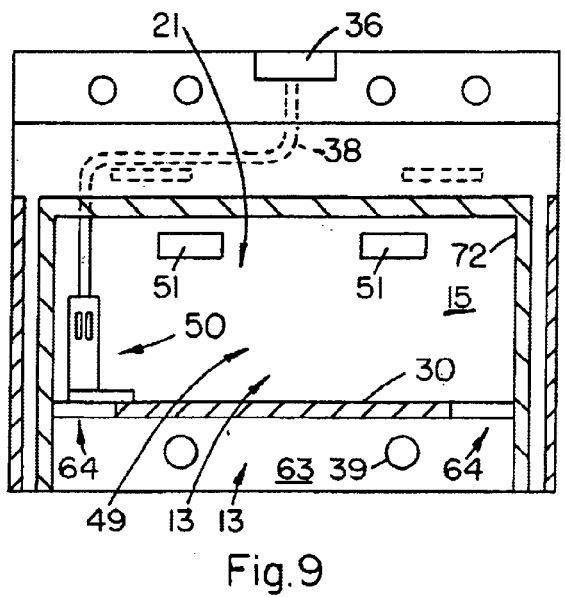
FIG. 9 is a front view of an oven with the front door and the front of the burner housing removed to show a preferred position for the steam generator of FIG. 8.

Referring to FIGS. 8 and 9 concerning a gas fired oven having gas burners 39, this particular embodiment 50 of the steam generator comprises a substantially vertically mounted tube 52 of about 12 in. in length, preferably stainless steel, schedule 40, having a top inlet pipe 54 connected to feed line 38 extending into tube 52 about, e.g., 1½ in., having a plurality of slots 56 of about, e.g., ¾ in. length and 3/16 in. width spaced, e.g., 30 degrees around the tube, and being welded to sides 58 of bracket 60.

The tube 52 is filled with, e.g., ¼ in, diameter stainless steel balls 62, preferably up to just below the inner end 55 of pipe 54. Bracket 60 is mounted, e.g., by welding to the oven base plate or floor 30 such that tube 52 is directly in the path of the HTA rising from burner chamber 63 thru inlet 64 into oven cavity 49. After circulation of the heated air in cavity 49 it is discharged to the atmosphere thru discharge vents such as 51 thru the back portion 84 of wall 11.

Figure 10:
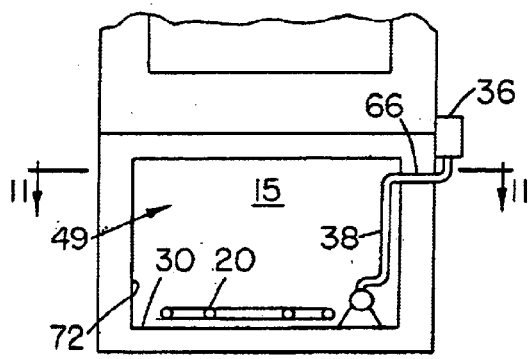
FIG. 10 is a front view of an oven with the door removed to show how the steam generator feed tube is mounted to enter into the oven cavity.
Figure 11:
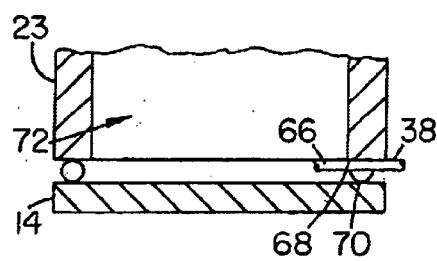
FIG. 11 is an enlarged cross-sectional view taken along line 11—11 of FIG. 10.

In FIGS. 10 and 11 the structure of the entry of water feed line 38 into oven cavity 49 is shown as simply interposing a generally laterally oriented section 66 of the line between a front portion 68 of the oven housing and a conventional compressible seal member 70 which is affixed to the oven door 14 so as to substantially heat and air seal the oven access opening generally designated 72 when the door is shut against the oven housing front. This seal 70 is sufficiently compressible to easily conform around line section 66 to maintain a good heat and air seal when the oven door is closed.

Referring to FIGS. 12 and 13, a very efficient gas fired oven construction is shown and comprises individually and/or in combination a unique heated air flow pattern and structure within the oven and a unique steam generator structure. The steam generator comprises a plate member which preferably is the oven floor 30 formed with a recess such as 74 which can be V shaped or concavely curved or the like and which can extend for any desired length along the floor, preferably laterally between the gas burners 39 located below the floor 30 in burner chamber 63. This recess should be dimensioned to hold a substantial quantity of steel balls or the like, preferably at least about two pounds for a typical home use oven.

The HTA (high t air) from the burner chamber enters into the oven cavity 49 thru ports such as 76 thru or around floor 30 of any selected size and number, and fresh air is fed into the burner chamber thru suitable vents such as 78 in the burner chamber floor 80. In this preferred construction, the heated air discharge vents 82 are provided thru the back portion 84 of wall 11, substantially adjacent the bottom thereof, e.g., starting 1–6 inches from floor 30, for venting to the atmosphere. Preferably, vent ducts such as 85 are provided to direct the exhaust air to a desirable vent location such as louvered openings 86 to the atmosphere. This location of the discharge vents 82 ensures that the upward HTA flow and the downward cooler air flow will be forced into a generally circular flow pattern substantially as indicated by the flow arrows in FIG. 12.

This airflow pattern reduces the heat up time for achieving a baking temperature of, e.g., about 450° F. from about 43 minutes to about 19 minutes and markedly improves the evenness of temperature throughout the oven with or without the use of convection fans. Also, when a steam generator is employed with this unique air flow pattern, more steam is trapped within the oven cavity for a longer period of time and further enhances more efficient heating in the oven which greatly reduces the duration of the gas burn periods and the burn frequency, and course also reduces the cost of operating the oven.

In a more preferred embodiment of the oven structure of FIGS. 12 and 13, as shown schematically in FIGS. 14–16, the described gas oven venting system may be modified by conjoining the lower vent ports 82 to the conventional upper vent port 51 by means of a common flue such as vent ducts 85. Interposed at the junction of each upper vent port 51 and flue 85 is a damper mechanism 87. Such mechanism is controllable by any conventional means including manually, or by means of a temperature sensitive coil or bimetalic strip, or electrically such as by means of a computer controlled solenoid valve means which can function according to a program to position the damper door at any angular position for any period of time to regulate the heated air flow thru either or both of ports 51 and 82 in any proportion to thereby maximize the effectiveness and efficiency of the air flow pattern within oven cavity 49. Such a damper system would allow one to use the upper vents 51 exclusively or lower vents 82 exclusively or a combination of the two.

The damper control means can be responsive either to temperature of discharge air or to flow rate (draw) of discharge air, (e.g., ft $^3$/min), or to a combination thereof. This modification is useful in reducing CO and $CO_2$ emissions during oven "warm up" until discharge temperature rises enough for adequate draw. Also, if the oven has a broiler mechanism in the roof of the oven that requires standard upper venting then venting exclusively thru 51 during broiling is an option.

A type of useful damper operating mechanism is shown as an example in FIG. 17 wherein flue gas flow is split between ports 51 and 82. In this mechanism a heat expansible metal coil 88 such as employed for rotating the choke blade in automotive carburetors according to temperature of incoming air is affixed in a convenient location within duct 85 both structurally and also one in which a representative of flue air can be felt by the coil. As shown in FIG. 17, a lever arm 90 is affixed to the output shaft 91 of the coil 88 affixed to the side of a recess in the side of damper blade 93 and is pivotally attached to one end of a pivot arm 92, the other end of which is pivotally attached to the inner side of the front wall 89. As the coil heats up, arm 90 will pivot clockwise and pivot the blade 93, e.g., from position "A" to position "B" or to position "C" depending on the temperature which it senses from the air being drawn thru port 51. As the coil cools, these positions are reversed.

In a highly preferred embodiment as shown in FIG. 18, a pair of damper blades, upper 94 and lower 96 are employed to regulate air flow from the oven cavity. In this regard, the gas burners in a conventional oven have an "off/on" cycle controlled by a thermopile/thermocouple. The present independent venting dampers and controls would allow both vents to be closed during the "off" cycle, in effect creating a closed oven cavity trapping the heat and further increasing the oven efficiency, for example when the oven is warming up, the upper vent 94 is open (lower 96 closed) during "on" portion of burn cycle.

When the flue reaches sufficient temperature to "draw" effectively, the lower vent 96 opens during the "on" portion of the burn cycle and the upper vent 94 closes and remains closed. During the "off" portion of the burn cycle both vents are in the closed position. Control of the dampers would be electromechanical means 98 and actuated from feedback from thermocouple/thermopiles in the oven, flues, or burners. This construction further increases fuel efficiency and decreases warm-up time.

This invention has been described in detail with particular reference to preferred embodiments thereof, but it will be understood that variations and modifications will be effected within the spirit and scope of the invention.

I claim:

1. A convection oven construction comprising a first wall structure forming a substantially closed oven cabinet (23) having a front portion (68), opposing sides (69), back wall (71) and to (73), a second wall structure (11) forming a substantially closed oven cavity (49) having an upper portion (21) and a lower portion (13), a HTA supply system mounted in said lower portion of said cavity for generating a rising HTA flow within said cavity means, air flow outlet structure (82) formed thru a lower section of said second wall structure (11), a discharge vent duct system (85) communicating with said outlet structure (82), said duct system (85) extending from said outlet structure upwardly to an upper portion of said cabinet and communicating with discharge vent means (51) and in said cabinet for discharging warm circulated air and combustion gases from said cavity to the atmosphere, whereby said duct system (85) operates as a chimney up through which said warm air and combustion gases are drawn and whereby circulation of fresh air into and out of said cavity is continued, and whereby said HTA from said supply system will rise into said upper portion of said cavity and then as it becomes cooler will gravitate downwardly into said lower portion of said cavity and exit thru said outlet structure (82), whereby said HTA will be forced to travel a longer residence path within said cavity and release a larger amount of heat energy into said cavity prior to discharge of said circulate air therefrom.

2. The oven construction of claim 1 wherein a steam generator system is mounted in said cavity and comprises a water inlet, a heat sink, a steam outlet, a water reservoir mounted on the exterior of said first wall structure on an upper portion thereof, and a water feed line passing thru said first and second wall structure and into said cavity and having one end connected to said reservoir and having its other end juxtaposed said water inlet, whereby a measured amount of water can be poured into said reservoir and conducted thru said feed line into said inlet and into contact with said heat sink to produce a desired amount of steam within said cavity.

3. The oven construction of claim 2 wherein said HTA supply system comprises a gas burner installation.

4. The oven construction of claim 3 wherein said steam generator system is mounted in said cavity directly within the upwardly directed HTA flow from the gas burner installation.

5. The oven construction of claim 2 wherein baffle plate structure is mounted in said cavity to substantially separate said gas burner installation from the remainder of said cavity, and wherein said heat sink comprises a recess indention in said baffle plate structure, and wherein a plurality of metal pieces are contained in said indentation.

6. The oven construction of claim 5 wherein said metal pieces are stainless steel balls.

7. The oven construction of claim 1 wherein said HTA supply system comprises an electrical heating element.

8. Oven construction comprising first wall means forming a substantially closed oven cabinet, second wall means forming a substantially closed oven cavity means having an upper portion and a lower portion, HTA supply means mounted in said lower portion of said cavity means for generating a rising HTA flow within said cavity means, first air flow outlet means formed thru an upper section of said second wall means, second air flow outlet means formed thru a lower section of said second wall means, said first and second outlet means communicating with a common outlet duct means, air flow control damper means on said duct means and moveable between a first position closing said first outlet means and to a second position closing said second outlet means and to any intermediate position, control means responsive to air temperature or air flow rate, or both within said duct means to move said damper means to any of said positions, whereby thru control of said damper means said HTA from said supply means can be caused to rise into said upper portion of said cavity means and then as it becomes cooler to gravitate downwardly into said lower portion of said cavity means and exit thin said second outlet means, whereby said HTA will be forced to travel a longer residence path within said cavity means and release a larger amount of heat energy into said cavity means prior to discharge of said HTA therefrom.

9. The oven construction of claim 8 wherein a steam generator means is mounted in said cavity means and comprises water inlet means, heat sink means, steam outlet means, water reservoir means mounted on the exterior of said first wall means on an upper portion thereof, and water feed line means passing thru said first and second wall means and into said cavity means and having one end connected to said reservoir means and having its other end juxtaposed said inlet means, whereby a measured amount of water can be poured into said reservoir means and conducted thru said feed line means into said inlet means and into contact with said heat sink means to produce a desired amount of steam within said cavity means.

10. The oven construction of claim 8 wherein said HTA supply means comprises a gas burner installation.

11. The oven construction of claim 10 wherein baffle plate means is mounted in said cavity means to substantially separate said gas burner installation from the remainder of said cavity means, wherein said heat sink means comprises a recess indention, in said baffle plate means, and wherein a plurality of metal pieces are contained in said indentation.

12. The oven construction of claim 11 wherein said metal pieces are stainless steel balls.

13. The oven construction of claim 11 wherein said steam generator means is mounted in said cavity means directly within the upwardly directed HTA flow from the gas burner installation.

14. The oven construction of claim 13 wherein said metal pieces are stainless steel balls.

15. The oven construction of claim 13 wherein said steam generator means is mounted in said cavity means directly within the upwardly directed HTA flow from the gas burner installation.

16. The oven construction of claim 8 wherein said HTA supply means comprises an electrical heating element.

17. The oven construction of claim 8 wherein said HTA supply means comprises an electrical heating element.

* * * * *